US012311378B2

(12) United States Patent
Okazaki et al.

(10) Patent No.: US 12,311,378 B2
(45) Date of Patent: May 27, 2025

(54) SAMPLE CRUSHING DEVICE

(71) Applicant: FRONTIER LABORATORIES LTD., Koriyama (JP)

(72) Inventors: Tsutomu Okazaki, Fukushima (JP); Atsushi Watanabe, Fukushima (JP); Chuichi Watanabe, Fukushima (JP)

(73) Assignee: FRONTIER LABORATORIES LTD., Koriyama (JP)

( * ) Notice: Subject to any disclaimer, the term of this patent is extended or adjusted under 35 U.S.C. 154(b) by 696 days.

(21) Appl. No.: 17/627,177

(22) PCT Filed: Mar. 19, 2021

(86) PCT No.: PCT/JP2021/011399
§ 371 (c)(1),
(2) Date: Jan. 14, 2022

(87) PCT Pub. No.: WO2021/261036
PCT Pub. Date: Dec. 30, 2021

(65) Prior Publication Data

US 2022/0266253 A1 Aug. 25, 2022

(30) Foreign Application Priority Data

Jun. 24, 2020 (JP) ................................ 2020-109194

(51) Int. Cl.
*B02C 17/00* (2006.01)
*B02C 17/14* (2006.01)
*B02C 17/20* (2006.01)

(52) U.S. Cl.
CPC .............. *B02C 17/14* (2013.01); *B02C 17/20* (2013.01)

(58) Field of Classification Search
CPC ................................ B02C 17/14; B02C 17/20
See application file for complete search history.

(56) References Cited

U.S. PATENT DOCUMENTS 5,567,050 A 10/1996 Zlobinsky et al.
2004/0132082 A1* 7/2004 Gautsch ............ C12N 15/1003 435/270

FOREIGN PATENT DOCUMENTS

JP 2000-202314 7/2000
JP 2003-126715 5/2003

(Continued)

OTHER PUBLICATIONS

European Search Report dated Jan. 26, 2024, European Application No. 21827564.2-1014, 6 pages.

(Continued)

*Primary Examiner* — Anshu Bhatia
(74) *Attorney, Agent, or Firm* — Rankin, Hill & Clark LLP

(57) ABSTRACT

A sample crushing device is provided that has a function of stably absorbing vibration of a support member supporting a sample container and vibration of other members which accompanies the vibration. When a rotating shaft 20 is rotated and driven by a rotation driving mechanism, revolving motions of a first support member 12 around an axis line X1 of a rotating shaft 10 and rotational movement of an inclined shaft 20 around an axis line X2 are restrained by a base 10 via first elastic members 14. As a result, the first support member 12 and sample containers 41 are vibrated in plural directions, and samples housed in the sample containers 41 are crushed by crushing media. Vibration of the first support member 12 in plural directions is absorbed by a base 1 via the first elastic members 14 coupled with each of the first support member 12 and the base 1.

5 Claims, 6 Drawing Sheets

(56) References Cited

FOREIGN PATENT DOCUMENTS

| | | |
|---|---|---|
| JP | 2004-050031 | 2/2004 |
| JP | 2004-313966 | 11/2004 |
| JP | 2005-087778 | 4/2005 |
| JP | 2005-534480 | 11/2005 |
| JP | 2013-107024 | 6/2013 |
| JP | 5351242 | 8/2013 |

OTHER PUBLICATIONS

International Search Report, Date of mailing: May 18, 2021, 2 pages.

* cited by examiner

SAMPLE CRUSHING DEVICE

TECHNICAL FIELD

The present invention relates to a sample crushing device that crushes a sample such as an organic material or an inorganic material.

BACKGROUND ART

A device has been suggested in which a sample such as cells or a tissue of a plant is, together with a crushing medium, housed in a crushing container, reciprocating motions in plural directions are applied to this crushing container, and the sample is thereby crushed by causing the crushing medium to collide with the sample in the crushing container (for example. Patent Literature 1).

In this crushing device, an inclined shaft is fixed to a rotating shaft while being inclined with respect to the rotating shaft, a support member is supported to be capable of relative rotation with respect to the inclined shaft via a rotating shaft bearing mechanism, and plural crushing containers in which samples and crushing media are housed are retained in an outer peripheral portion of the support member. Further, as a measure which restrains rotation of the support member around the inclined shaft, a magnetic force is used which is generated between a magnet fixed to the support member and an opposite pole magnet fixed to a device base side.

Further, a technique has been disclosed in which in order to restrain rotation of a support member while reducing a load to a motor driving a rotating shaft, not by using a contactless procedure such as a magnet but by using rotational movement in coupling portions among members configuring a link mechanism, vibration of the support member and vibration of other members accompanying the vibration are absorbed by contact with the link mechanism (for example, Patent Literature 2).

CITATION LIST

Patent Literature

Patent Literature 1: Japanese Patent Laid-Open No. 2005-087778

Patent Literature 2: Japanese Patent No. 5351242

SUMMARY OF INVENTION

Technical Problem

However, because a link mechanism is configured with plural members capable of relative rotational movement in coupling portions, due to slight imbalance in frictional forces, jamming with dust, or the like in the coupling portions of the plural portions, it is possible that an operation of the link mechanism becomes unstable and vibration of a support member and vibration of other members accompanying the vibration are not absorbed.

Accordingly, an object of the present invention is to provide a sample crushing device that has a function of stably absorbing vibration of a support member supporting a sample container and vibration of other members accompanying the vibration.

Solution to Problem

A sample crushing device of the present invention includes:

- a base;
- a rotation driving machine which is fixed to the base;
- a rotating shaft which is rotated and driven by the rotation driving machine;
- an inclined shaft which is fixed to the rotating shaft in a state where the inclined shaft is inclined with respect to the rotating shaft;
- a first support member which is supported to be capable of relative rotation with respect to the inclined shaft on an outside of the inclined shaft via a first rotating shaft bearing mechanism and which supports plural sample containers in a state where the plural containers are apart from the inclined shaft around the inclined shaft; and
- a first elastic member which is coupled with each of the first support member and the base and is stretchable in a longitudinal direction.

In the sample crushing device in the above configuration, the plural sample containers are supported by the first support member in a state where samples (crushing target objects) and crushing media are housed in the sample containers and where the sample containers are apart from the inclined shaft around the inclined shaft. In this state, the rotating shaft is rotated and driven by a rotation driving mechanism in such a posture that an axis line of the rotating shaft is parallel with a perpendicular direction, and the inclined shaft is rotated and driven around the axis line of the rotating shaft. In this case, because revolving motions of the first support member around the axis line of the rotating shaft and rotational movement of the inclined shaft around an axis line are restrained by the base via the first elastic member, the first support member vibrates around the axis line of the inclined shaft and vibrates to cause its outer periphery to rise and fall in an up-down direction. As a result, the sample containers supported by the first support member are vibrated in each of plural directions, and the samples housed in the sample containers are thereby crushed by the crushing media. Vibration of the first support member in plural directions is absorbed by the base via the first elastic member.

Because the first elastic member is only coupled with each of the first support member and the base, the possibility is removed or reduced that its stretching motions are restrained by other configuration elements of a sample pulverizing device. Thus, the possibility is removed or reduced that a problem occurs such as friction forces against the other configuration elements or jamming with dust, and vibration of the first support member and vibration of other members such as the inclined shaft and the rotating shaft, which accompanies the vibration, can stably be absorbed by the base by stretching motions of the first elastic member.

In the sample crushing device of the present invention, one end portions of the plural first elastic members are preferably coupled with the first support member respectively in plural parts in rotational symmetry with respect to an axis line of the inclined shaft as a reference, and other end portions of the plural first elastic members are preferably coupled with the base respectively in plural parts in rotational symmetry with respect to an axis line of the rotating shaft as a reference.

In the sample crushing device in the above configuration, equalization of a form of absorption of vibration of the first support member around the axis line of the inclined shaft and vibration in the up-down direction by stretching motions of the plural first elastic members is intended. Accordingly, vibration of the first support member in each of plural direction is stably absorbed, and further vibration of the other members, which accompanies the vibration of the first support member, is more stably absorbed.

The sample crushing device of the present invention preferably further includes:

- a second support member which supports the rotating shaft to be capable of relative rotation on an outside of the rotating shaft via a second rotating shaft bearing mechanism; and
- a second elastic member which is interposed between the second support member and the base and at least partially has elasticity.

In the sample crushing device in the above configuration, vibration of the first support member in plural directions is propagated to the second support member via the inclined shaft, the rotating shaft, and the second rotating shaft bearing mechanism, and the second support member vibrates; however, this vibration is absorbed by the base via the second elastic member. Because the second elastic member is only interposed between the second support member and the base, the possibility is removed or reduced that its elastic deformation is restrained by the other configuration elements of the sample pulverizing device. Thus, the possibility is removed or reduced that a problem occurs such as friction forces against the other configuration elements or jamming with dust, and vibration of the first support member and vibration of the other members such as the inclined shaft and the rotating shaft, which accompanies the former vibration, can more stably be absorbed by the base by elastic deformation of the second elastic member in addition to stretching motions of the first elastic member.

In the sample crushing device of the present invention,

- the plural second elastic members are preferably interposed between the second support member and the base respectively in plural parts in rotational symmetry with respect to an axis line of the rotating shaft as a reference.

In the sample crushing device in the above configuration, equalization of a form of absorption of vibration of the second support member in plural directions in a case where vibration of the first support member around the axis line of the inclined shaft and vibration in the up-down direction are propagated, by stretching motions of the plural second elastic members, is intended. Accordingly, vibration of the first support member in each of plural direction is stably absorbed, and further vibration of the other members, which accompanies the vibration of the first support member, is more stably absorbed.

DESCRIPTION OF EMBODIMENTS (Configuration)

Figure 1:
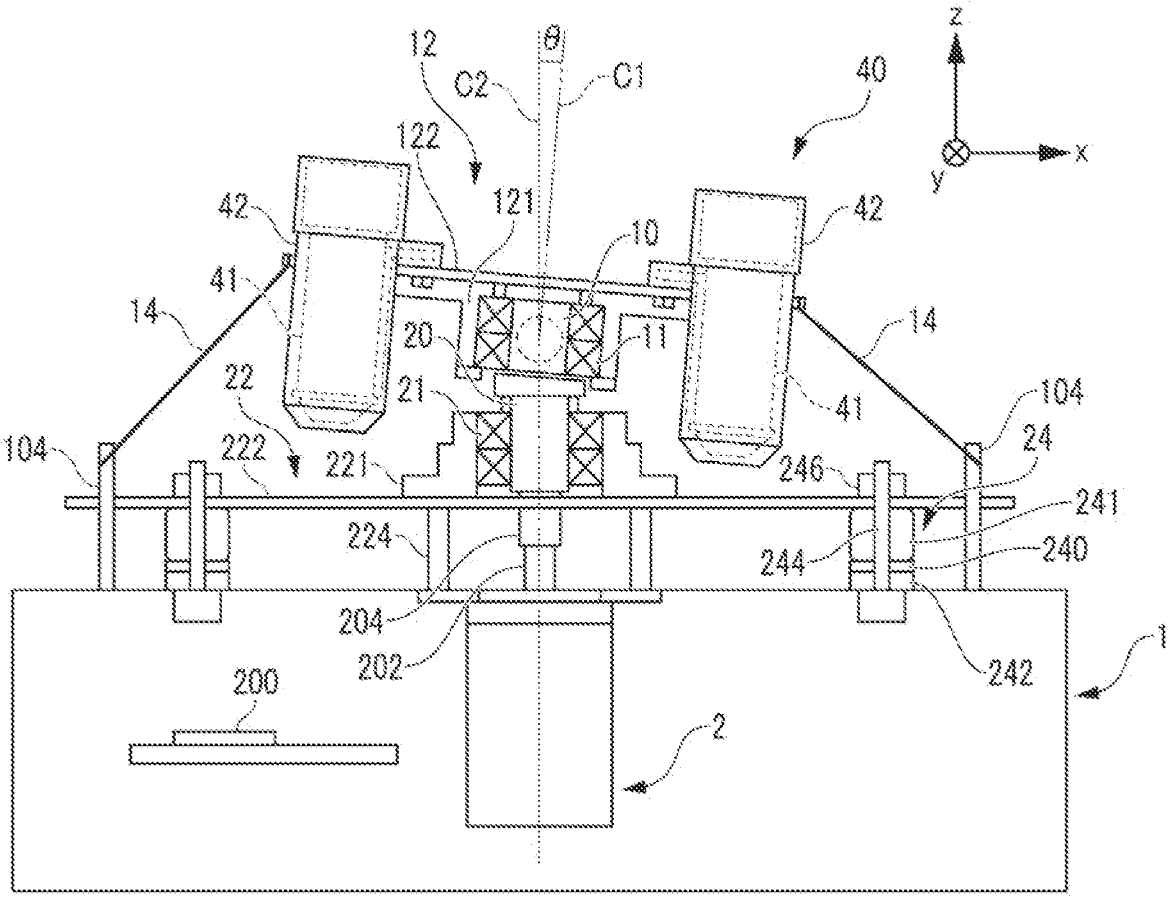
FIG. 1 is a side view of a sample crushing device as one embodiment of the present invention, which is partially a vertical cross-sectional view.
Figure 2:
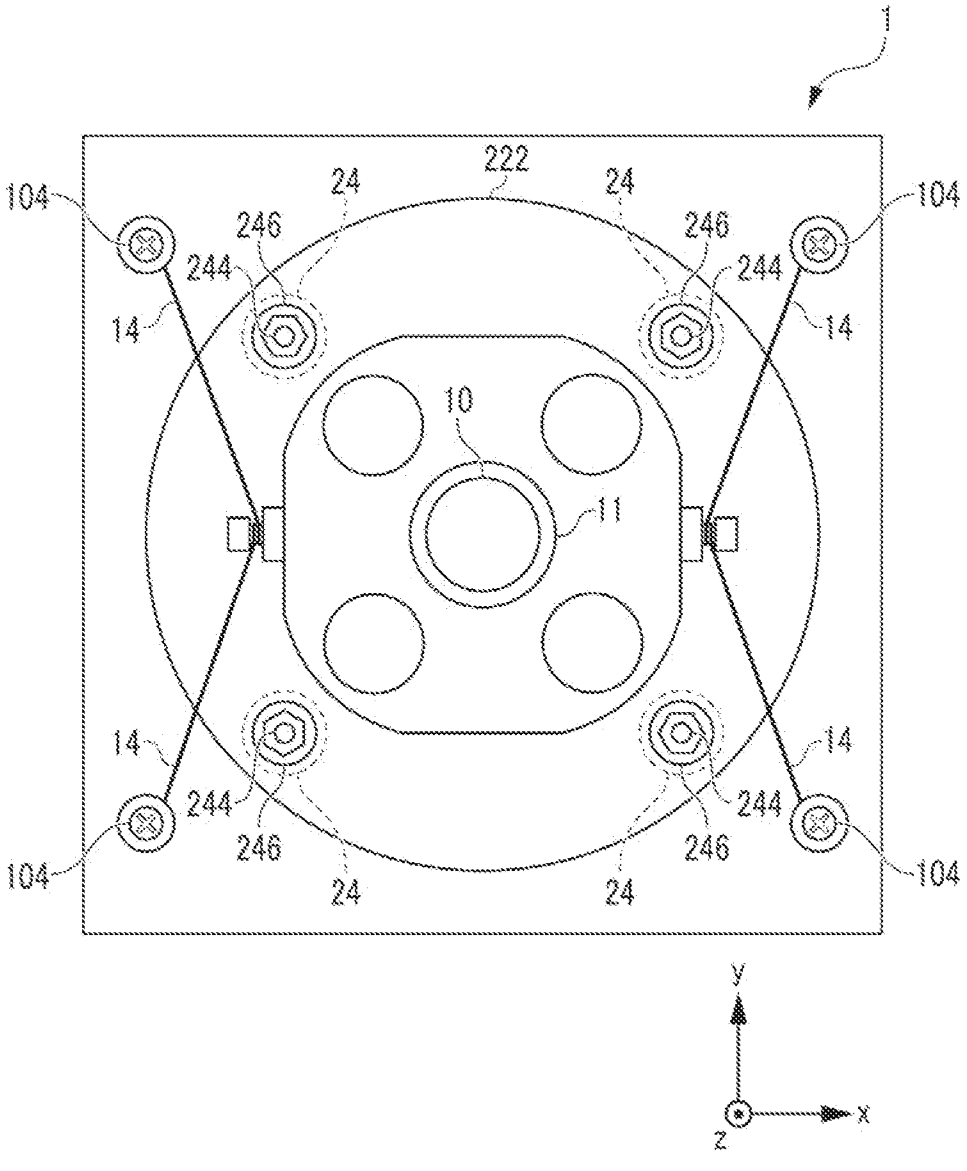
FIG. 2 is a top view of the sample crushing device as one embodiment of the present invention.

A sample crushing device as one embodiment of the present invention, which is illustrated in FIG. 1 and FIG. 2, includes a base 1, a rotation driving machine 2, a rotating shaft 20, an inclined shaft 10, a first support member 12, and first elastic members 14. The sample crushing device includes a second support member 22 and second elastic members 24. For easy understanding of positions and postures of configuration elements of the sample crushing device. FIG. 1 and FIG. 2 illustrate three-dimensional orthogonal coordinate system in which a perpendicular direction is set as a z direction and two directions orthogonal to each other in a horizontal plane are set as an x direction and a y direction.

The base 1 (housing) is configured with metal and/or resin, for example, and is placed or fixed to a placing table via a vibration-proof member. The base 1 is provided with an output interface which displays operating states such as a rotation speed and a temperature of the rotation driving machine 2 and, in addition, a touch panel which configures an input interface by which a worker designates the rotation speed of the rotation driving machine 2.

The rotation driving machine 2 is configured with an electric motor, for example, and is fixed to the base 1. Power from a power source (for example, an external commercial power supply or a battery) is controlled by a driving driver 200 housed in the base 1 and is supplied to the rotation driving machine 2, and an operation of the rotation driving machine 2 is thereby controlled. The driving driver 200 is configured with an arithmetic processing device such as a core processor and a storage device such as a memory.

The rotating shaft 20 is coupled or connected with an output shaft 202 of the rotation driving machine 2 via a coupling portion 204. Each of an axis line C2 of the rotating shaft 20 and an axis line of the output shaft 202 of the rotation driving mechanism 2 extends along the same straight line which extends in the perpendicular direction (z-axis direction). The inclined shaft 10 is fixed to a distal end portion of the rotating shaft 20 in a state of being inclined with respect to the distal end portion, and its axis line C1 is inclined at an angle $\theta$ (for example, $\theta=5°$ to $30°$) with respect to the axis line C2 of the rotating shaft 20. The rotating shaft 20 may indirectly be coupled with the output shaft 202 of the rotation driving machine 2 via a force transmission mechanism such as pulleys and a pulley belt, gears or a speed reduction mechanism, or a cam mechanism.

The first support member 12 is configured with a first tubular element 121 and a first plate-shaped element 122. The first tubular element 121 and the first plate-shaped element 122 may integrally be configured or may separately be configured and then coupled together. The first tubular element 121 has a generally cylindrical shape and is, on the inside thereof, supported to be capable of relative rotation with respect to the inclined shaft 10 via a first rotating shaft bearing mechanism 11 (for example, ball bearings).

The first plate-shaped element 122 is fixed to the first tubular element 121 while sticking out to the outside thereof and has a generally square plate shape whose corners have round shapes, and plural (for example, four) through holes 1220 are formed which pass through the first plate-shaped element 122 in the thickness direction thereof. The first plate-shaped element 122 may be formed into a rotationally symmetric shape with respect to the center axis line of the first support member 12 or the first tubular element 121 as a reference such as a disk shape, an elliptic plate shape, a regular polygonal plate shape, or a parallelogram plate shape or may be formed into a shape which is not rotationally symmetric such as a trapezoidal plate shape. The plural through holes 1220 are arranged to be rotationally symmetric with respect to the center axis line of the first support member 12 or the first tubular element 121 as a reference. In a state where a holder 42 in which the sample container 41 is housed is inserted in the through hole 1220 in a vertical direction, the holder 42 is fixed to the first plate-shaped element 122 by an appropriate mechanical fixing measure such as a clamping mechanism. Accordingly, plural sample containers 41 are supported by the first support member 12 in a state of being apart from the inclined shaft 10 around the inclined shaft 10. A slit which continuously extends from an outer periphery to an inside may be formed in the first plate-shaped element 122 so as to avoid interference with the first elastic member 14, and the holder 42 may be fixed to the first plate-shaped element 122 while being guided, with respect to the slit, to the inside from a lateral direction.

By providing a through hole and/or a hole (recess) or a groove other than the through hole 1220, for example, the first plate-shaped element 122 and further the first support member 12 may be lightened. Accordingly, weight reduction of the first support member 12 is intended, and as a result, reduction in loads applied to a rotation driving machine 2 and other portions due to vibration of the first support member 12 is intended.

Cooling medium piping for circulating a cooling medium (for example, water) for cooling the sample container 41 is connected with the holder 42, and this cooling medium piping is connected with an external cooling medium supply source through flexible piping.

The first elastic member 14 is configured with a string-shaped or belt-shaped member having elasticity such as a rubber band or a rubber string which is stretchable in a longitudinal direction and/or with a spring such as a coil spring. The first elastic members 14 are respectively coupled with outer peripheral portions of the first support member 12 (or coupling members which locally protrude outward from the outer peripheral portions) and with plural rod-shaped coupling members 104 which are provided to protrude above the base 1 as illustrated in FIG. 1. In a case where the first elastic members 14 are configured with rubber bands or rubber strings, the first elastic members 14 may respectively be simply wound around or tied with the outer peripheral portions of the first support member 12 and the coupling members 104.

As illustrated in FIG. 2, two (or one) string-shaped or long first elastic members 14 are coupled with a three-o'clock part (with the o'clock, bearings with respect to the center axis line of the first support member 12 or an axis line C2 of the rotating shaft 20 as a reference are indicated, and the same applies to the following) of the outer peripheral portion of the first support member 12 and are respectively coupled with two coupling members 104 which are arranged in half-past one-o'clock and half-past four-o'clock parts in the base 1. Similarly, as illustrated in FIG. 2, two (or one) string-shaped or long first elastic members 14 are coupled with a nine-o'clock part of the outer peripheral portion of the first support member 12 and are respectively coupled with two coupling members 104 which are arranged in half-past seven-o'clock and half-past ten-o'clock parts in the base 1. Accordingly, as illustrated in FIG. 2, the first support member 12 is coupled with the base 1 via the first elastic member 14 in each of the three-o'clock and nine o'clock parts.

That is, one end portions of the plural first elastic members 14 are coupled with the first support member 12 respectively in plural parts in rotational symmetry with respect to the axis line C1 of the inclined shaft 10 as a reference, and the other end portions of the plural first elastic members 14 are coupled with a base 1 respectively in plural parts in rotational symmetry with respect to the axis line C2 of the rotating shaft 20 as a reference.

The number and arrangement form of first elastic members 14 form may variously be changed. In the first support member 12 or the first plate-shaped element 122, the first elastic members 14 may be coupled with parts on the inside of its outer peripheral portion. The first elastic members 14 may be coupled not only with side surfaces of the first support member 12 but also with an upper surface side and/or a lower surface side. Plural coupling parts of the first elastic members 14 with respect to the first support member 12 may not have to be in rotational symmetry with respect to the axis line C1 of the inclined shaft 10. The number of coupling members 104 may be three or less or five or more. An arrangement form of the plural coupling members 104 and further the plural coupling parts of the first elastic members 14 with respect to the base 1 may not have to be in rotational symmetry with respect to the axis line C2 of the rotating shaft 20.

Figure 3:
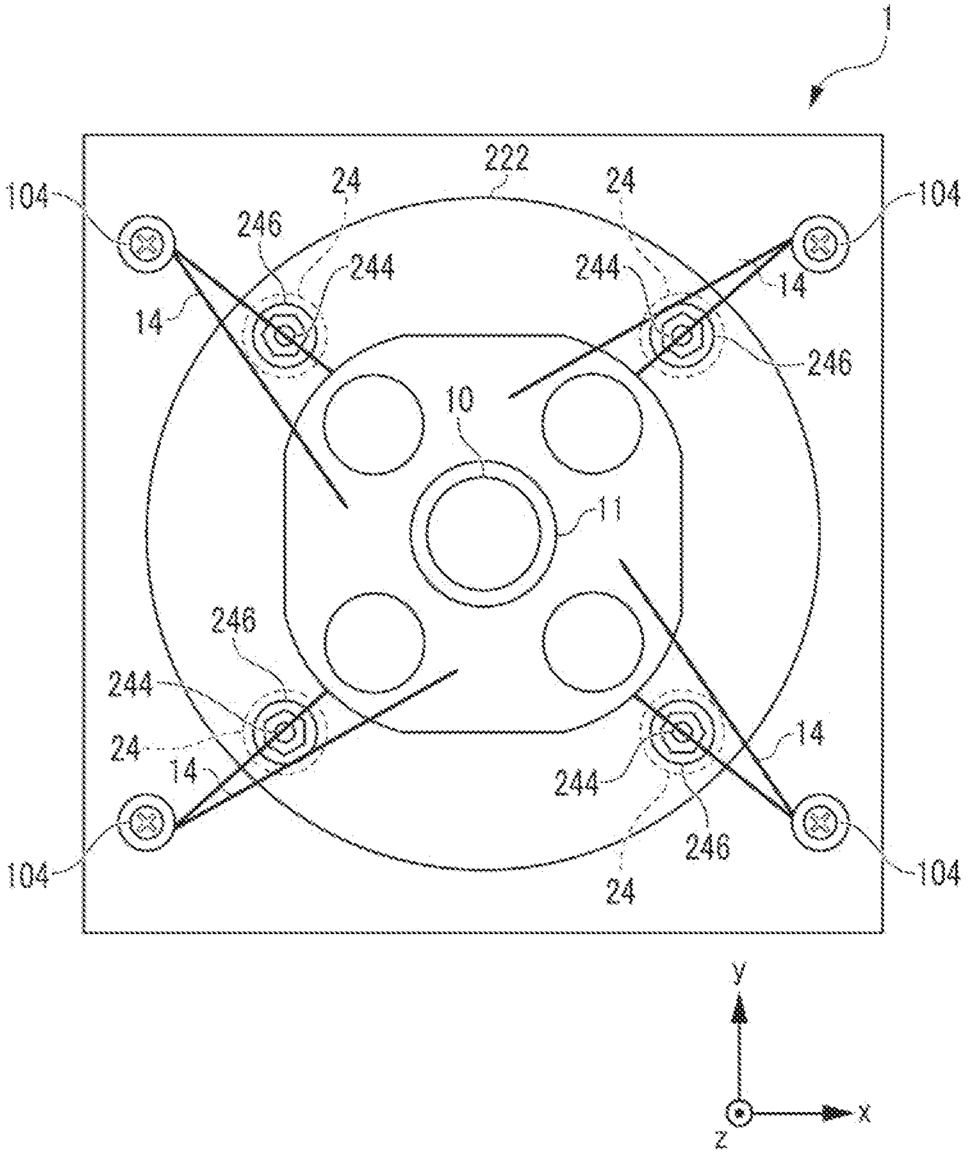
FIG. 3 is an explanation diagram about a first modified arrangement form of first elastic members.
Figure 4:
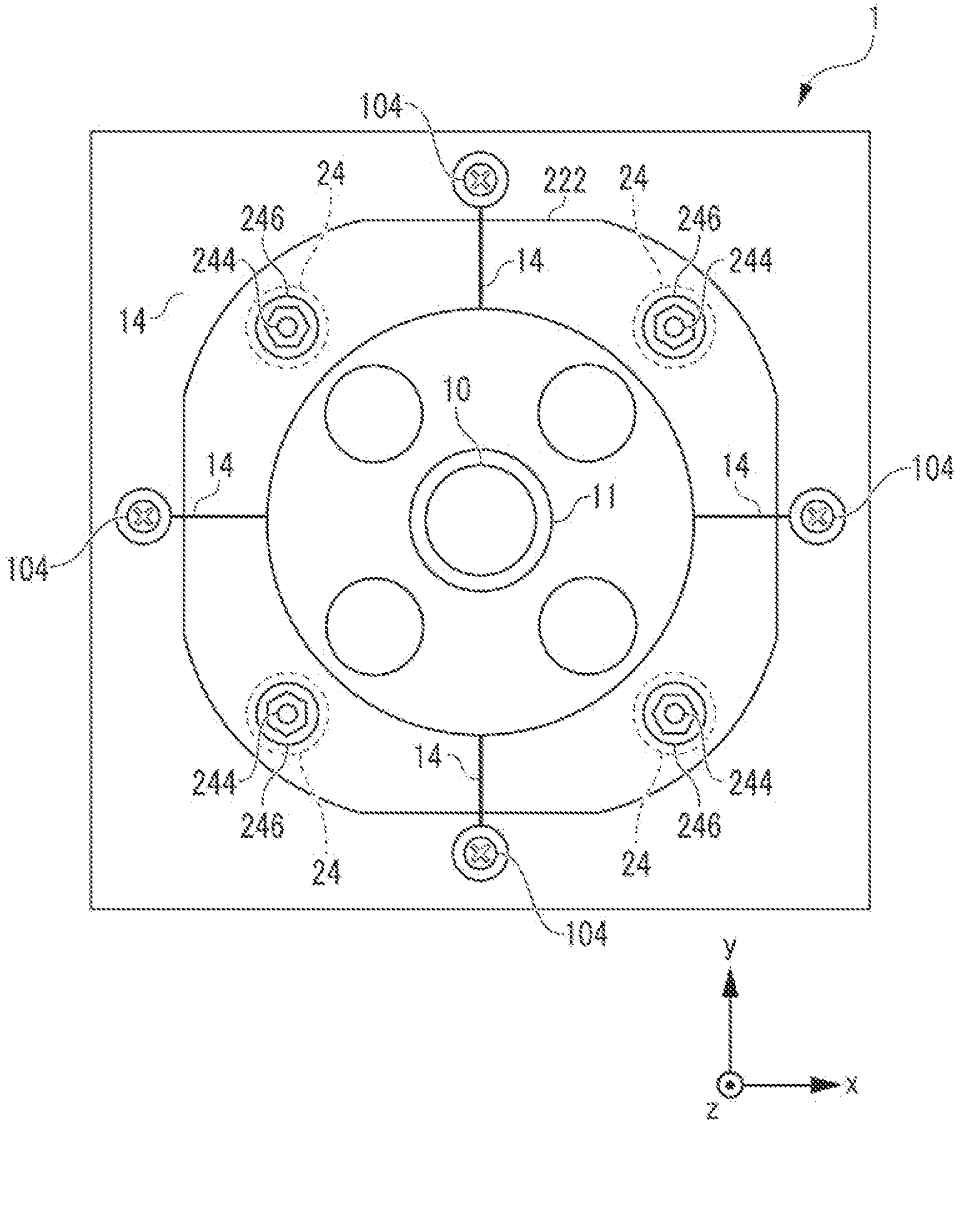
FIG. 4 is an explanation diagram about a second modified arrangement form of the first elastic members.

For example, as illustrated in FIG. 3, two (or one) first elastic members 14 may be coupled between each of half-past (n+3)-o'clock parts (n=0, 1, 2, 3) in the outer peripheral portion of the first support member 12 and n-o'clock parts on the inside of the outer peripheral portion and the coupling member 104 which is arranged in a half-past n-o'clock part in the base 1. As illustrated in FIG. 4, one (or plural) first elastic member 14 may be coupled between an n-o'clock part in the outer peripheral portion of the first support member 12 and the coupling member 104 arranged in the n-o'clock part in the base 1.

The second support member 22 is configured with a second tubular element 221 and a second plate-shaped element 222. The second tubular element 221 and the second plate-shaped element 222 may integrally be configured or may separately be configured and then coupled together. The second tubular element 221 has a generally cylindrical shape with steps, whose diameter is stepwise increased from an upper side to a lower side, and is, on the inside thereof, supported to be capable of relative rotation with respect to the rotating shaft 20 via a second rotating shaft bearing mechanism 21 (for example, ball bearings). The second plate-shaped element 222 is fixed to the second tubular element 221 while sticking out to the outside thereof and has a generally annular plate shape. The second plate-shaped element 222 may be formed into a rotationally symmetric shape with respect to the center axis line of the second support member 22 or the second tubular element 221 as a reference such as an elliptic plate shape, a regular polygonal plate shape, or a parallelogram plate shape or may be formed into a shape which is not rotationally symmetric such as a trapezoidal plate shape.

The second elastic member 24 is configured with a washer 240, a first vibration-proof member 241, a second vibration-proof member 242, a bolt 244, and a nut 246. The first vibration-proof member 241 is configured with rubber such as generally cylindrical silicon rubber. Each of the first vibration-proof member 241 and the second vibration-proof member 242 is configured with vibration-proof rubber such as generally cylindrical or generally annular silicon rubber or butadiene rubber. Rubber configuring each of the first vibration-proof member 241 and the second vibration-proof member 242 may be the same or different. The second elastic member 24 may be fixed to the base 1 and the second support member 22 while one or three or more cylindrical or annular vibration-proof members are interposed between the base 1 and the second support member 22.

As illustrated in FIG. 1, the first vibration-proof member 241, the washer 240 (or an annular metal plate), and the second vibration-proof member 242 are interposed between the base 1 and the second plate-shaped element 222 while being superposed in order from an upper side and are fixed to the base 1 and the second support member 22 by the bolt 244 passing through those and the nut 246 screwed on an end portion of the bolt 244. Accordingly, as illustrated in FIG. 2, the second support member 22 is coupled with the base 1 via the second elastic member 24 in each of half-past one-o'clock, half-past four-o'clock, half-past seven-o'clock, and half-past ten-o'clock positions. That is, the plural second elastic members 24 are interposed between the base 1 and the second support member 22 respectively in plural parts in rotational symmetry with respect to the axis line C2 of the rotating shaft 20 as a reference.

The shape, number, arrangement form of second elastic members 24 may variously be changed. One generally annular second elastic member 24 or plural arc-shaped second elastic members 24, the second elastic member 24 surrounding the rotating shaft 20, may be interposed between the second support member 22 and the base 1. The number of second elastic members 24 may be three or less or five or more. An arrangement form of the plural coupling members 104 and further the plural coupling parts of the second elastic members 24 with respect to the base 1 may not have to be in rotational symmetry with respect to the axis line C2 of the rotating shaft 20.

(Function)

In the sample crushing device in the above configuration as one embodiment of the present invention, the plural sample containers 41 are supported by the first support member 12 in a state where samples (crushing target objects) and crushing media are housed in the sample containers 41 and where the sample containers 41 are apart from the inclined shaft 10 around the inclined shaft 10. In this state, the rotating shaft 20 is rotated and driven by a rotation driving mechanism in such a posture that the axis line C2 of the rotating shaft 20 is parallel with the perpendicular direction, and the inclined shaft 10 is rotated and driven around the axis line C2 of the rotating shaft 20. In this case, revolving motions of the first support member 12 around an axis line C1 of a rotating shaft 20 and rotational movement of an inclined shaft 10 around the axis line C2 are restrained by the base 1 via the first elastic members 14. Thus, the first support member 12 vibrates around the axis line C1 of the inclined shaft 10 and vibrates to cause its outer periphery to rise and fall in an up-down direction. As a result, the sample containers 41 supported by the first support member 12 are vibrated in each of plural directions, and the samples housed in the sample containers 41 are thereby crushed by the crushing media.

Vibration of the first support member 12 in plural directions is absorbed by the base 1 by stretching motions of the first elastic members 14. Further, vibration of the first support member 12 in plural directions is propagated to the second support member 22 via the inclined shaft 10, the rotating shaft 20, and the second rotating shaft bearing mechanism 21, and the second support member 22 vibrates; however, this vibration is absorbed by the base 1 via the second elastic members 24.

Because the first elastic members 14 are only coupled with each of the first support member 12 and the base 1, the possibility is removed or reduced that its stretching motions are restrained by other configuration elements of a sample pulverizing device. Because second elastic members 24 are only interposed between the second support member 22 and the base 1, the possibility is removed or reduced that their elastic deformation is restrained by the other configuration elements of the sample pulverizing device. Thus, the possibility is removed or reduced that a problem occurs such as friction forces against the other configuration elements or jamming with dust, and vibration of the first support member 12 and vibration of other members such as the inclined shaft 10 and the rotating shaft 20, which accompanies the vibration, can stably be absorbed by the base 1 by stretching motions of the first elastic members 14.

OTHER EMBODIMENT OF THE PRESENT INVENTION

Figure 5:
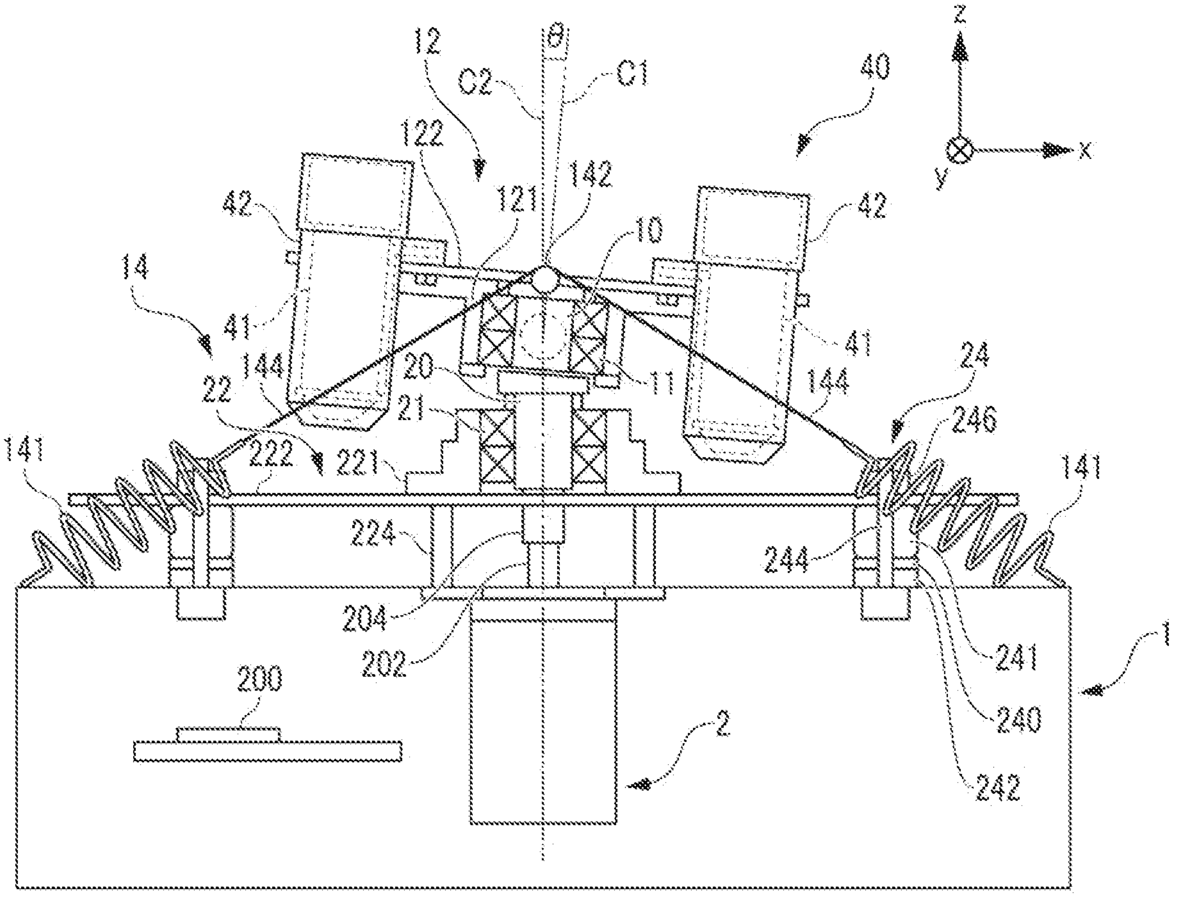
FIG. 5 is a side view of a sample crushing device as another embodiment of the present invention, which is partially a vertical cross-sectional view.
Figure 6:
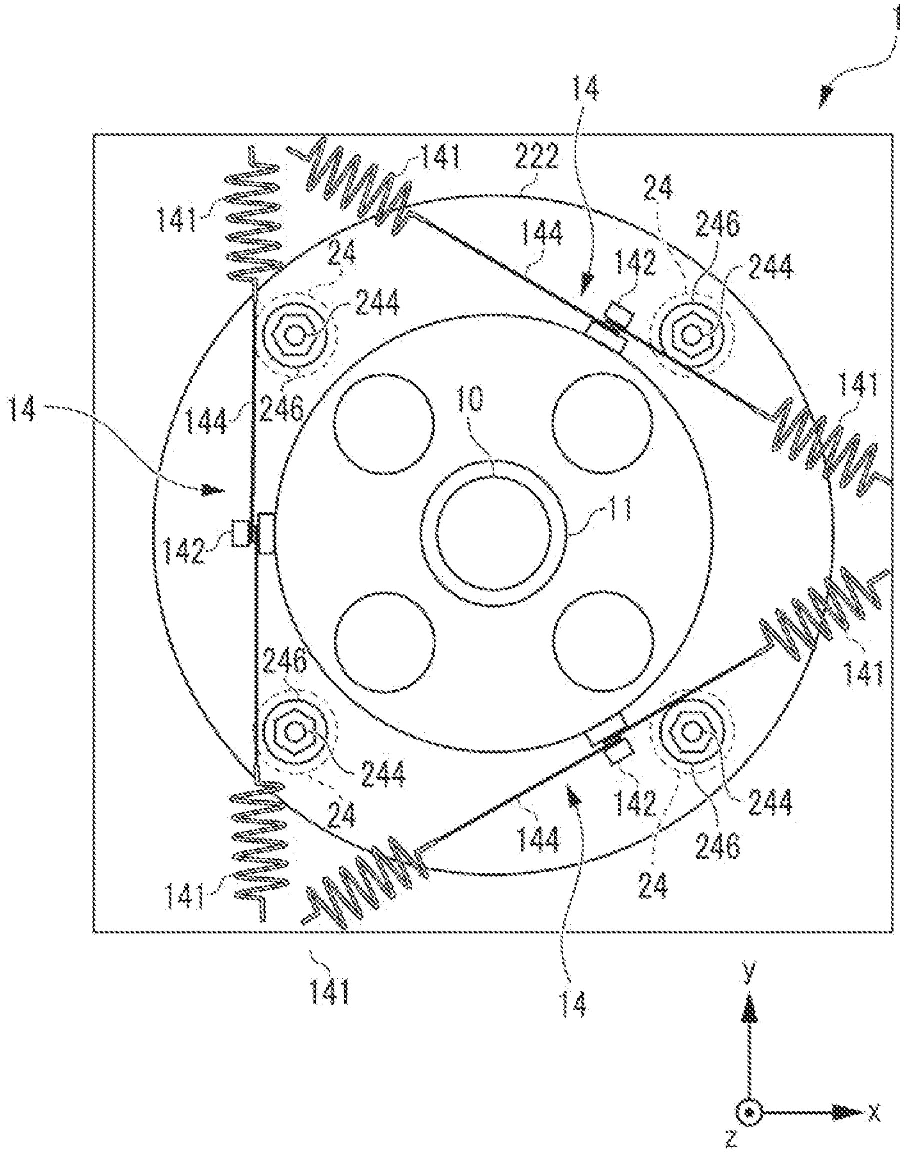
FIG. 6 is a top view of the sample crushing device as the other embodiment of the present invention.

A sample crushing device as another embodiment of the present invention, which is illustrated in FIG. 5 and FIG. 6, has similar configurations to the above embodiment except a configuration of a first elastic member 14. Thus, the same reference characters are used for the similar configurations, and descriptions thereof will not be made.

As illustrated in FIG. 5 and FIG. 6, the first elastic member 14 is configured with a pair of spring members 141 fixed to the base 1, a roller 142 which is capable of rotational movement with respect to the first support member 12 or a first plate-shaped element 122 in a general disk shape in this embodiment, and a wire 144 whose both end portions are coupled with the pair of spring members 141 and which is wound around the roller 142 in an intermediate portion. The wire 144 may be formed of metal but may also be configured with silicon rubber or the like which itself has elasticity.

As illustrated in FIG. 6, in the present embodiment, three rollers 142 are respectively provided in one-o'clock, five-o'clock, and nine o'clock parts. The number and arrangement form of rollers 142 may variously be changed. As illustrated in FIG. 6 similarly, in a top view, one pair of spring members 141 and the roller 142 are generally linearly arranged.

In the sample crushing device in the above configuration as the other embodiment of the present invention, vibration of the first support member 12 in plural directions is absorbed by the base 1 by stretching motions of the spring members 141 and rotational movement of the rollers 142 via the wires 144.

REFERENCE SIGNS LIST

1 base
2 rotation driving machine
10 inclined shaft
11 first rotating shaft bearing mechanism
12 first support member
14 first elastic member
20 rotating shaft
21 second rotating shaft bearing mechanism
22 second support member

24 second elastic member
41 sample container
42 holder
121 first tubular element
122 first plate-shaped element
200 driving driver
221 second tubular element
222 second plate-shaped element
1220 through hole

The invention claimed is:

1. A sample crushing device comprising:

a base;

a rotation driving machine which is fixed to the base;

a rotating shaft which is rotated and driven by the rotation driving machine;

an inclined shaft which is fixed to the rotating shaft in a state where the inclined shaft is inclined with respect to the rotating shaft;

a first support member which is supported to be capable of relative rotation with respect to the inclined shaft on an outside of the inclined shaft via a first rotating shaft bearing mechanism and which supports plural sample containers in a state where the plural containers are apart from the inclined shaft around the inclined shaft; and a plurality of first elastic members which are coupled with the first support member in respective first designated parts positioned farther from a center than parts supporting the plural sample containers in the first support member and are coupled with the base and which are stretchable in a longitudinal direction.

2. The sample crushing device according to claim 1, wherein the plurality of first elastic members are coupled with the base in respective second designated parts which are positioned farther from the rotating shaft than the first designated parts of the first support member in the base.

3. The sample crushing device according to claim 1, wherein one end portions of the plurality of first elastic members are coupled with the first support member respectively in plural parts in rotational symmetry with respect to an axis line of the inclined shaft as a reference, and other end portions of the plurality of first elastic members are coupled with the base respectively in plural parts in rotational symmetry with respect to an axis line of the rotating shaft as a reference.

4. The sample crushing device according to claim 1, further comprising:

a second support member which supports the rotating shaft to be capable of relative rotation on an outside of the rotating shaft via a second rotating shaft bearing mechanism; and a plurality second elastic members which are interposed between the second support member and the base and at least partially have elasticity.

5. The sample crushing device according to claim 4, wherein the plurality of second elastic members are interposed between the second support member and the base respectively in plural parts in rotational symmetry with respect to an axis line of the rotating shaft as a reference.

* * * * *